Patented Oct. 7, 1952

2,613,187

UNITED STATES PATENT OFFICE 2,613,187

PREPARATION OF A SUPPORTED $H_3PO_4$ CATALYST

Julian M. Mavity, Hinsdale, Ill., assignor to Universal Oil Products Company, Chicago, Ill., a corporation of Delaware No Drawing. Application June 14, 1949, Serial No. 99,122

12 Claims. (Cl. 252—435)

1

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefin polymerization reactions, its stability in service, and in its relatively low corrosive properties when employed in ordinary commercial apparatus comprising various types of steel.

An object of this invention is a method of producing a hydrocarbon conversion catalyst which has a high resistance to crushing during use.

Another object of this invention is a highly active catalyst suitable for use in the polymerization of olefinic hydrocarbons and in other hydrocarbon conversion reactions involving olefins.

One specific embodiment of this invention relates to a process for manufacturing a solid catalyst which comprises mixing a phosphoric acid, a siliceous adsorbent, and an oxygen-containing organic silicon compound selected from the members of the group consisting of an alkyl orthosilicate and a siloxane, and calcining the resultant mixture.

Another embodiment of this invention relates to a process for manufacturing a solid catalyst which comprises mixing a phosphoric acid, a siliceous adsorbent, and an alkyl orthosilicate to form a composite, and calcining said composite.

A still further embodiment of this invention relates to a process for manufacturing a solid catalyst which comprises mixing a phosphoric acid, a siliceous adsorbent, and a siloxane to form a composite, and calcining said composite.

An additional embodiment of this invention relates to a process for manufacturing a solid catalyst which comprises mixing a phosphoric acid, a siliceous adsorbent, and a polymeric dialkyl siloxane to form a composite, and calcining said composite.

Another embodiment of this invention relates

2 to a process for manufacturing a solid catalyst which comprises mixing a phosphoric acid, a siliceous adsorbent, and a polymeric dimethyl siloxane to form a composite, and calcining said composite.

A further embodiment of this invention relates to a process for manufacturing a solid catalyst which comprises mixing pyrophosphoric acid, diatomaceous earth, and a polymeric dimethyl siloxane to form a composite, and calcining said composite.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be produced although the invention is not restricted to their use but may employ any of the other acids of phosphorus insofar as they are adaptable. It is not intended to infer, however, that the different acids of phosphorus, which may be employed will produce catalysts which have identical effects upon any given organic reactions as each of the catalysts produced from different acids and by slightly varied procedure will exert its own characteristic action.

In using orthophosphoric acid as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the ortho-phosphoric acid. Within these concentration ranges, the acids will be liquids of varying viscosities, and readily mixed with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures or to mixtures of other polyphosphoric acids and siliceous adsorbents may be different from that used when the ortho acid is so employed.

Triphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperatures, the crystals of the tetraphosphoric acid separate from the viscous liquid and it is found that these crystals melt at approximately 93° F. and have a specific gravity of 1.1886, at a temperature of 60° F. However, it is unnecessary to crystallize the tetraphosphoric acid before employing it in the preparation of the solid catalysts inasmuch as the crude tetraphosphoric acid mixture may be incorporated with the siliceous adsorbent and other catalyst ingredient.

The materials which may be employed as adsorbents or carriers for acids of phosphorus are divided roughly into two classes. The first class comprises materials of predominantly siliceous character and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earths and clays, such as bentonite, montmorillonite, acid treated clays, and the like. Each adsorbent or supporting material which may be used will exert its own specific influence upon the net effectiveness of the catalyst composite which will not necessarily be identical with that of other members of the class.

The oxygen-containing organic silicon compounds used as additives or strengthening agents for the preparation of solid phosphoric acid catalysts as set forth herein are selected from the members of the group consisting of an alkyl orthosilicate and a siloxane. The alkyl orthosilicates may be regarded as esters of silicic acid and these organic oxygen-containing compounds of silicon have the general formula $Si(OR)_4$ in which R represents an alkyl group generally containing from 1 to about 5 carbon atoms, although these alkyl groups may also contain more than 5 carbon atoms. The alkyl orthosilicates preferred for use in this process include methylorthosilicate, ethylorthosilicate, and the propylorthosilicates. Other oxygen-containing organic compounds of silicon which may be used in my catalyst production process may be referred to as siloxanes or as silicones. These compounds include relatively high molecular weight polymeric dialkyl siloxanes having the consistency of oils, resins, and greases. The terms "silocones" and "siloxanes" are general terms which are descriptive of organic silicon compounds containing both carbon-silicon linkages and silicon-oxygen-silicon linkages.

Silicones usable in this process are of three types, corresponding to: (1) the dehydration product of a silanol of the formula $R_3SiOH$ which may be called a monosilanol; (2) the dehydration product of a silane-diol of the formula $R_2Si(OH)_2$ and (3) the dehydration product of a silane-triol represented by the formula $RSi(OH)_3$. The formulas of these different silanols and of their corresponding dehydration products, which are known as silicones and also as siloxanes, are listed below:

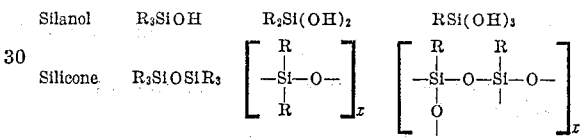

In the above indicated formulas, the R groups represent an alkyl, aryl or aralkyl group. The silicones which are also referred to as siloxanes may be pure compounds containing one or more of the same or different R groups or mixtures of different siloxanes may be utilized in this process.

Catalysts may be prepared from an acid of phosphorus such as orthophosphoric acid, pyrophosphoric acid, triphosphoric acid, or tetraphosphoric acid, and a siliceous adsorbent containing an added oxygen-containing organic silicon compound selected from the members of the group consisting of an alkyl orthosilicate and a siloxane. These mentioned starting materials used in this catalyst preparation process are subjected to the successive steps of mixing the siliceous adsorbent with the added oxygen-containing organic silicon compound, and thereafter mixing the phosphoric acid with the finely divided relatively inert carrier containing the oxygen-containing organic silicon compound. This mixing operation is generally carried out at a temperature of from about 50° to about 450° F. to form an aggregate, the acid ordinarily being in major proportion by weight. Also the oxygen-containing organic silicon compound may be added first to the phosphoric acid, or the catalyst ingredients may be mixed in any desirable order.

The resultant aggregate is a slightly moist to almost dry material which upon being compressed, becomes sufficiently plastic that it can be extruded and formed into shaped particles. The resultant particles are then calcined at a temperature of from about 200° to about 1000° F. for a time of from about 0.25 to about 10 hours to form a substantially solid material. The calcining may be carried out by heating the catalyst particles in a substantially inert gas, such as air, nitrogen, and the like.

The resultant catalyst which has been calcined is active for promoting polymerization of olefinic hydrocarbons particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions, suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

In utilizing the catalysts of this invention for promoting miscellaneous organic reactions, the catalysts may be employed in essentially the same way as they are used when polymerizing olefins, in case the reactions are essentially vapor phase, and they also may be employed in suspension in liquid phase in various types of equipment.

With suitable modifications in the details of operation, the present type of catalyst may be employed in a large number of organic reactions including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydro-halogenation of unsaturated organic compounds, isomerization reactions, ester formation by the interaction of carboxylic acids and olefins, and the like. The specific procedure for utilizing the present type of catalysts in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activities during polymerization use and also suffer a marked decrease in crushing strength due to softening of the catalyst. Such softening of the catalyst also results in short catalyst life inasmuch as the catalyst towers become plugged during use. In this process, I have found that catalysts of high crushing strengths may be produced by adding to the composite of phosphoric acid and diatomaceous earth a relatively small amount of an oxygen-containing organic silicon compound selected from the members of the group consisting of an alkyl orthosilicate and a siloxane, this amount being generally not more than about 10% and preferably from about 0.5 to about 5% by weight of the catalyst mixture. Such a catalyst containing an organic silicon compound also has a good crushing strength after it has been used in the polymerization reaction. Pyrophosphoric acid-diatomaceous earth composites to which the above-indicated amounts of an oxygen-containing organic silicon compound has been added and then the resultant composite has been dried and calcined have been found to produce catalysts having a high crushing strength, this strength being much higher than that of similar catalyst materials prepared from phosphoric acid and the same siliceous adsorbent, but in the absence of the oxygen-containing organic silicon compounds. These catalysts have been tested in converting propylene into propylene polymers in rotatable steel autoclaves and have been found to retain a high crushing strength after such polymerization use in which from 25 to 50% of the propylene charged is converted into liquid products.

Accordingly, by this process highly active catalysts of good structural strength are produced by mixing from about 50 to about 75% by weight of a phosphoric acid, from about 15 to about 49.5% by weight of a siliceous adsorbent, and from about 0.5 to about 10% by weight of an oxygen-containing organic silicon compound selected from the members of the group consisting of an alkyl orthosilicate and a siloxane to form a composite, shaping said composite into particles, drying said particles at a temperature of from about 200° to about 500° F., and calcining the dried particles at a temperature of from about 500° to about 1000° F. for a time of from about 0.25 to about 10 hours.

The following examples of the preparation of catalysts comprised within the scope of this invention and the results obtained in their use for catalyzing the polymerization of propylene are characteristic, although the exact details set forth in these examples are not to be construed as imposing undue limitations upon the generally broad scope of the invention.

Table I shows comparative results obtained in autoclave tests on polymerization catalysts prepared from orthophosphoric acid-diatomaceous earth and various amounts of an oxygen-containing organic silicon compound. These catalyst activity tests were carried out by placing 10 grams of 5x5 mm. pellets of catalyst and 100 grams of a propane propylene mixture (50–55% propylene content) in a rotatable steel autoclave of 850 cc. capacity which was then rotated at a temperature of 450° F. for 2 hours. At the end of this time, determinations were made to indicate the percentage conversion of propylene into liquid polymers.

TABLE I

*Propylene polymerizing activities and crushing strengths of catalysts prepared from 67–70% by weight of orthophosphoric acid, 28–29% by weight of diatomaceous earth, and 1 to 5% by weight of an oxygen-containing organic silicon compound.*

Test Conditions: 10 grams catalyst pellets, 100 grams propane-propylene mixture (52–55 mole percent propylene), maintained for two hours at a temperature of 450° F. in an 850 cc. rotating autoclave.

| Run No. | Material added to mixture of ortho-phosphoric acid and diatomaceous earth | Calcination ° F. | Hours | Percent Conv. of $C_3H_6$ | Crushing strength, lbs. Before Use | Crushing strength, lbs. After Use |
|---|---|---|---|---|---|---|
| 1 | 1% $(EtO)_4Si$ | 860 | 1 | 40 | 26.6+ | 27+ |
| 2 | 1% Silicone Fluid | 860 | 1 | 28 | 26.4+ | 26.4+ |
| 3 | 5% Silicone Fluid | 680 | 1 | 25 | 24.3+ | 24.8+ |
| 4 | 1% Silicone Resin | 860 | 1 | 32 | 25.6+ | 27+ |
| 5 | 5% Silicone Resin | 680 | 1 | 30 | 25.2+ | 22.5+ |
| 6 | do | 860 | 1 | 28 | 26.3+ | 27+ |
| 7 | 1% Silicone Grease | 860 | 1 | 30 | 27+ | 27+ |
| 8 | 5% Silicone Grease | 680 | 1 | 25 | 23.3+ | 20.4+ |

Outstanding among these catalysts prepared from organic silicon compounds in which oxygen is present is the catalyst prepared by adding 1% by weight of ethylorthosilicate to a composite or orthophosphoric acid and diatomaceous earth followed by calcining the composite at a temperature of 860° F. for a time of one hour. This catalyst converted 40% of the propylene into liquid polymers, it had an average crushing strength of 26.6 lbs. before use and an after crushing strength of 27 lbs.

Other catalysts prepared from orthophosphoric acid, diatomaceous earth, and either 1% or 5% of silicone fluid which is a polymeric dimethyl siloxane, gave catalysts which after calcination at 680° F. and 860° F. had activities of 25 to 28% propylene conversion and crushing strengths both before and after use of from 24 to 26 pounds.

Similar catalyst composites in which orthophosphoric acid and diatomaceous earth were mixed with 5% by weight of silicone resins were calcined for one hour at temperatures of 680° F. and 860° F. The resultant catalysts effected the polymerization of from 28 to 30% of the propylene present in the autoclave tests. The crushing strength of these catalysts before use were from 25 to 26 pounds while the after use crushing strengths were 22 and 27 pounds respectively.

Other solid polymerization catalysts were formed from orthophosphoric acid, diatomaceous earth and from 1 to 5% by weight of silicone grease. These catalysts calcined at temperatures of 680° and 860° F. for one hour had propylene conversion activities between 25 and 30%, before use crushing strength of 22 to 27 pounds, and after use crushing strength of 20 to 27 pounds as indicated in Table I.

In comparison with the above indicated catalysts, a commercial polymerization catalyst manufactured from pyrophosphoric acid and diatomaceous earth and calcined for one hour at a temperature of 860° F. had an initial crushing strength of 16 pounds and an after use crushing strength of 9 pounds.

I claim as my invention:

1. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of an oxygen-containing organic silicon compound selected from the group consisting of an alkyl orthosilicate and a siloxane to form a composite, and calcining said composite.

2. The process of claim 1 further characterized in that said silicon compound is an alkyl orthosilicate.

3. The process of claim 1 further characterized in that said silicon compound is a siloxane.

4. The process of claim 1 further characterized in that said silicon compound is a polymeric dialkyl siloxane.

5. The process of claim 1 further characterized in that said silicon compound is a polymeric dimethylsiloxane.

6. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of an oxygen-containing organic silicon compound selected from the group consisting of an alkyl orthosilicate and a siloxane to form a composite, and calcining said composite at a temperature of from about 200° to about 1000° F.

7. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of an oxygen-containing organic silicon compound selected from the group consisting of an alkyl orthosilicate and a siloxane to form a composite, shaping said composite into particles, and calcining said particles at a temperature of from about 200° to about 1000° F. for a time of from about 0.25 to about 10 hours.

8. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of an alkyl orthosilicate to form a composite, shaping said composite into particles, and calcining said particles at a temperature of from about 200° to about 1000° F.

9. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a siloxane to form a composite, shaping said composite into particles, and calcining said particles at a temperature of from about 200° to about 1000° F.

10. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a polymeric dialkyl siloxane to form a composite, shaping said composite into particles, and calcining said particles at a temperature of from about 200° to about 1000° F.

11. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a polymeric dimethylsiloxane to form a composite, shaping said composite into particles, and calcining said particles at a temperature of from about 200° to about 1000° F.

12. A process of catalyst manufacture which comprises mixing from about 50 to about 75% by weight of pyrophosphoric acid, from about 15 to about 49.5% by weight of diatomaceous earth, and from about 0.5 to about 10% by weight of an oxygen-containing organic silicon compound selected from the group consisting of an alkyl orthosilicate and a siloxane at a temperature of from about 50° to about 450° F. to form a composite, shaping said composite into particles, and calcining said particles at a temperature of from about 200° to about 1000° F. for a time of 0.25 to about 10 hours.

JULIAN M. MAVITY.

REFERENCES CITED

The following references are of record in the file of this patent:

UNITED STATES PATENTS

| Number | Name | Date |
|---|---|---|
| 1,482,740 | Ellis | Feb. 5, 1924 |
| 2,030,048 | Brown | Feb. 11, 1936 |
| 2,120,723 | Watson | June 14, 1938 |
| 2,204,157 | Semon | June 11, 1940 |
| 2,231,452 | Morrell | Feb. 11, 1941 |
| 2,400,621 | Alther | May 21, 1946 |
| 2,441,214 | Thomas et al. | May 11, 1948 |
| 2,442,884 | Webb et al. | June 8, 1948 |
| 2,446,619 | Stewart et al. | Aug. 10, 1948 |
| 2,488,449 | Trautman | Nov. 15, 1949 |